United States Patent
Hale et al.

(10) Patent No.: US 9,183,206 B2
(45) Date of Patent: *Nov. 10, 2015

(54) POLICY BASED POPULATION OF GENEALOGICAL ARCHIVE DATA

(71) Applicant: INTERNATIONAL BUSINESS MACHINES CORPORATION, Armonk, NY (US)

(72) Inventors: Michael D. Hale, Raleigh, NC (US); Tian M. Pan, Shanghai (CN); Randy A. Rendahl, Raleigh, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/462,892

(22) Filed: Aug. 19, 2014

(65) Prior Publication Data
US 2014/0358864 A1 Dec. 4, 2014

Related U.S. Application Data

(63) Continuation of application No. 13/478,358, filed on May 23, 2012, now Pat. No. 8,856,082.

(51) Int. Cl.
*G06F 17/30* (2006.01)
*G06F 3/0481* (2013.01)

(52) U.S. Cl.
CPC ........ *G06F 17/30073* (2013.01); *G06F 3/0481* (2013.01); *G06F 17/30286* (2013.01); *G06F 17/30864* (2013.01); *G06F 17/30893* (2013.01); *G06F 17/30961* (2013.01)

(58) Field of Classification Search
CPC ................... G06F 17/30073; G06F 17/30286; G06F 17/30864; G06F 17/30893; G06F 17/30961; G06F 3/0481; G06F 3/0482; G06F 9/4443; G05B 23/02; G05B 15/02; H04L 41/22
USPC ......... 707/667, 668, 769, 740, 802, 692, 736, 707/797, 777, 778, 829, 670, 671, 956, 707/E17.014, E17.018, E17.044, E17.089, 707/E17, 5, E17.05, E17.048, E17.012, 707/E17.087, E17.067, E17.007; 715/739, 715/735, 853, 717, 235; 709/203, 204, 223, 709/224, 226, 230, 231, 217, 218, 219; 705/3, 7, 26, 1.1, 310, 40, 51, 52

See application file for complete search history.

(56) References Cited

U.S. PATENT DOCUMENTS 6,654,029 B1   11/2003   Chiu et al.
6,886,015 B2    4/2005   Notargiacomo et al.
(Continued)

OTHER PUBLICATIONS

Shohei Yokoyama et al.—"An access control method based on the prefix labeling scheme for XML repositories"—Published in: Proceeding ADC '05 Proceedings of the 16th Australasian database conference—vol. 39—2005—pp. 105-113.*

(Continued)

*Primary Examiner* — Anh Ly
(74) *Attorney, Agent, or Firm* — Lisa Ulrich; Roberts Mlotkowski Safran & Cole, P.C.

(57) ABSTRACT

An approach for managing a family tree archive is provided. The approach includes creating an electronic archive based on a family tree. The approach also includes automatically discovering Internet-based data associated with at least one member of the family tree. The approach additionally includes adding the Internet-based data to the archive. The approach further includes storing the archive at a storage device.

18 Claims, 5 Drawing Sheets

(56) References Cited

U.S. PATENT DOCUMENTS

| | | | |
|---|---|---|---|
| 7,003,528 B2 | 2/2006 | Dan et al. | |
| 7,047,488 B2 | 5/2006 | Ingersoll et al. | |
| 7,643,456 B2 | 1/2010 | Jouppi et al. | |
| 7,747,719 B1 | 6/2010 | Horvitz et al. | |
| 7,945,852 B1* | 5/2011 | Pilskalns | 715/230 |
| 8,224,862 B2 | 7/2012 | Sacks | |
| 2003/0046401 A1* | 3/2003 | Abbott et al. | 709/228 |
| 2003/0113727 A1 | 6/2003 | Girn et al. | |
| 2005/0116954 A1 | 6/2005 | Ripps et al. | |
| 2005/0147947 A1 | 7/2005 | Cookson, Jr. et al. | |
| 2005/0149522 A1 | 7/2005 | Cookson, Jr. et al. | |
| 2006/0031239 A1* | 2/2006 | Koenig | 707/100 |
| 2007/0061424 A1* | 3/2007 | Mattaway | 709/219 |
| 2007/0143321 A1 | 6/2007 | Meliksetian et al. | |
| 2007/0266003 A1 | 11/2007 | Wong et al. | |
| 2008/0033933 A1* | 2/2008 | Cookson et al. | 707/5 |
| 2008/0172407 A1* | 7/2008 | Sacks | 707/102 |
| 2008/0172408 A1 | 7/2008 | Meliksetian et al. | |
| 2008/0208867 A1* | 8/2008 | Poston et al. | 707/E17.007 |
| 2009/0030985 A1* | 1/2009 | Yuan | 709/204 |
| 2009/0100046 A1 | 4/2009 | Huck | |
| 2009/0157513 A1* | 6/2009 | Bonev et al. | 705/14 |
| 2009/0216569 A1 | 8/2009 | Bonev et al. | |
| 2009/0240722 A1 | 9/2009 | Yu et al. | |
| 2009/0249076 A1 | 10/2009 | Reed et al. | |
| 2009/0288033 A1 | 11/2009 | Van Valkenburgh et al. | |
| 2009/0313299 A1 | 12/2009 | Bonev et al. | |
| 2009/0319539 A1 | 12/2009 | Soppet et al. | |
| 2009/0319610 A1* | 12/2009 | Nikolayev et al. | 709/204 |
| 2009/0327928 A1 | 12/2009 | Dedis et al. | |
| 2010/0199222 A1* | 8/2010 | Kranik et al. | 715/853 |
| 2010/0205179 A1* | 8/2010 | Carson et al. | 707/740 |
| 2011/0015947 A1* | 1/2011 | Erry et al. | 705/3 |
| 2011/0047056 A1* | 2/2011 | Overman et al. | 705/35 |
| 2011/0066630 A1 | 3/2011 | Balduccini et al. | |
| 2011/0093435 A1* | 4/2011 | Zha et al. | 707/639 |
| 2011/0213830 A1 | 9/2011 | Lopez et al. | |
| 2012/0030238 A1* | 2/2012 | DeLuca et al. | 707/777 |
| 2012/0054190 A1 | 3/2012 | Peters | |
| 2012/0078503 A1* | 3/2012 | Dzubay et al. | 701/410 |
| 2012/0264521 A1 | 10/2012 | Wells et al. | |
| 2012/0331095 A1* | 12/2012 | Morgan et al. | 709/217 |
| 2013/0018960 A1* | 1/2013 | Knysz et al. | 709/204 |
| 2013/0080467 A1 | 3/2013 | Carson et al. | |
| 2013/0268373 A1 | 10/2013 | Grishaver | |

OTHER PUBLICATIONS

Bonacina, Stefano et al.—"A Web-Based System for Family Health Record"—Published in: Engineering in Medicine and Biology Society, 2007. EMBS 2007. 29th Annual International Conference of the IEEE—Date of Conference: Aug. 22-26, 2007 Lyon pp. 3652-3656.*
E. Ya. Tetushkin—"Genetic aspects of Genealogy"—Russian Journal of Genetics—Nov. 2011, vol. 47, Issue 11, (pp. 1288-1306).
K Cheng, D.K. Harrison, and P.Y Pan—"Implementation of agile manufacturing—an AI and Internet based approach"—Journal of Materials Processing Technology—vol. 76, Issues 1-3, Apr. 1998, pp. 96-101.
Mell, P., "The NIST Definition of Cloud Computing", National Institute of Standards of Technology, Information Technology Laboratory, Ver 15, Oct. 7, 2009, pp. 1-2.

* cited by examiner

POLICY BASED POPULATION OF GENEALOGICAL ARCHIVE DATA

TECHNICAL FIELD

The present invention generally relates to archiving family history and, more particularly, to methods and systems for identifying and storing information in a family tree archive.

BACKGROUND

Families around the world create and retain significant amounts of information about themselves and their extended family. Historically this has been in the form of photo albums, videos (e.g., 8 MM, VHS, Beta tapes, etc.), letters and verbal lore. Traditionally, these are passed from one generation to another, often with limited or no background, or with scant information which slowly erodes the value of the data. Even worse, all too often this information is totally lost in the face of disasters or simple neglect.

Much of this data is lost in the course of time. Even when it is not, people spend significant amounts of time exploring archives and attics to learn more about their ancestors. The collection of this data, even when it is already available through electronic means, is tedious due to the need to traverse the relationships, identify the correct contacts that are relatives and then extract the extended data into an archive meant to provide a growing history of the family to pass on through the generations.

Tracking and capturing family history beyond the basic family tree is commonly an ad-hoc behavior that can include online and offline activities. In these cases, both on and off line, the work of tracking down the contacts, locating and collecting the information, and putting in place a retention system is performed manually. Additionally, the heavy lifting of doing most of these steps is left to a few, or often one, member(s) of the family that are willing to put in the effort to pull together a family history. Even with that level of effort it is usually limited to brief bios, contact information and perhaps a photo or two all put in the context of the family tree, perhaps provided by a service or built through sheer legwork by the organizer.

SUMMARY

In a first aspect of the invention, a method is implemented in a computer infrastructure including a combination of hardware and software. The method includes creating an electronic archive based on a family tree. The method also includes automatically discovering Internet-based data associated with at least one member of the family tree. The method further includes adding the Internet-based data to the archive. The method additionally includes storing the archive at a storage device.

In another aspect of the invention, a system is implemented in hardware and includes a computer infrastructure operable to: create an electronic archive including a plurality of nodes, wherein each respective one of the plurality of nodes corresponds to a respective member of a family tree; discover data associated with at least one member of the family tree by crawling through the plurality of nodes and analyzing at least one site identified in at least one of the plurality of nodes; determine the data complies with a content policy defined for the archive; receive approval from a user of the archive to add the data to the archive; and add the data to the archive.

In an additional aspect of the invention, a computer program product includes a computer readable storage medium having readable program code embodied in the storage medium. The computer program product includes at least one component operable to create an electronic archive including a plurality of nodes. Each respective one of the plurality of nodes corresponds to a respective member of a family tree. The at least one component is further operable to discover data associated with at least one member of the family tree by crawling through the plurality of nodes and analyzing at least one website identified in at least one of the plurality of nodes. The at least one website comprises at least one of a social networking website and a professional networking website. The at least one component is further operable to add the data to the archive.

In a further aspect of the invention, a method of managing a family tree archive includes providing a computer infrastructure being operable to create an electronic archive including a plurality of nodes, wherein each respective one of the plurality of nodes corresponds to a respective member of a family tree. The computer infrastructure is also operable to receive an indication of relationship policies and content policies. The computer infrastructure is also operable to discover data associated with at least one member of the family tree by crawling through the plurality of nodes and analyzing at least one website identified in at least one of the plurality of nodes. The computer infrastructure is also operable to determine the data complies with the content policies. The computer infrastructure is also operable to receive approval to add the data to the archive. The computer infrastructure is also operable to add the data to the archive.

In another aspect of the invention, a computer system for managing a family tree archive includes a CPU, a computer readable memory and a computer readable storage media. The system includes first program instructions to create an electronic archive including a plurality of nodes, wherein each respective one of the plurality of nodes corresponds to a respective member of a family tree. The system includes second program instructions to receive an indication of relationship policies and content policies. The system includes third program instructions to discover data associated with at least one member of the family tree by crawling through the plurality of nodes and analyzing at least one website identified in at least one of the plurality of nodes. The system includes fourth program instructions to determine the data complies with the content policies. The system includes fifth program instructions to present the data to a user for permitting or denying adding the data to the archive. The system includes sixth program instructions to add the data to the archive based on the user indicating permission to add the data to the archive. The first, second, third, fourth, fifth, and sixth program instructions are stored on the computer readable storage media for execution by the CPU via the computer readable memory. The at least one website comprises at least one of a social networking website and a professional networking website.

BRIEF DESCRIPTION OF THE SEVERAL VIEWS OF THE DRAWINGS

The present invention is described in the detailed description which follows, in reference to the noted plurality of drawings by way of non-limiting examples of exemplary embodiments of the present invention.

DETAILED DESCRIPTION

Figure 1:
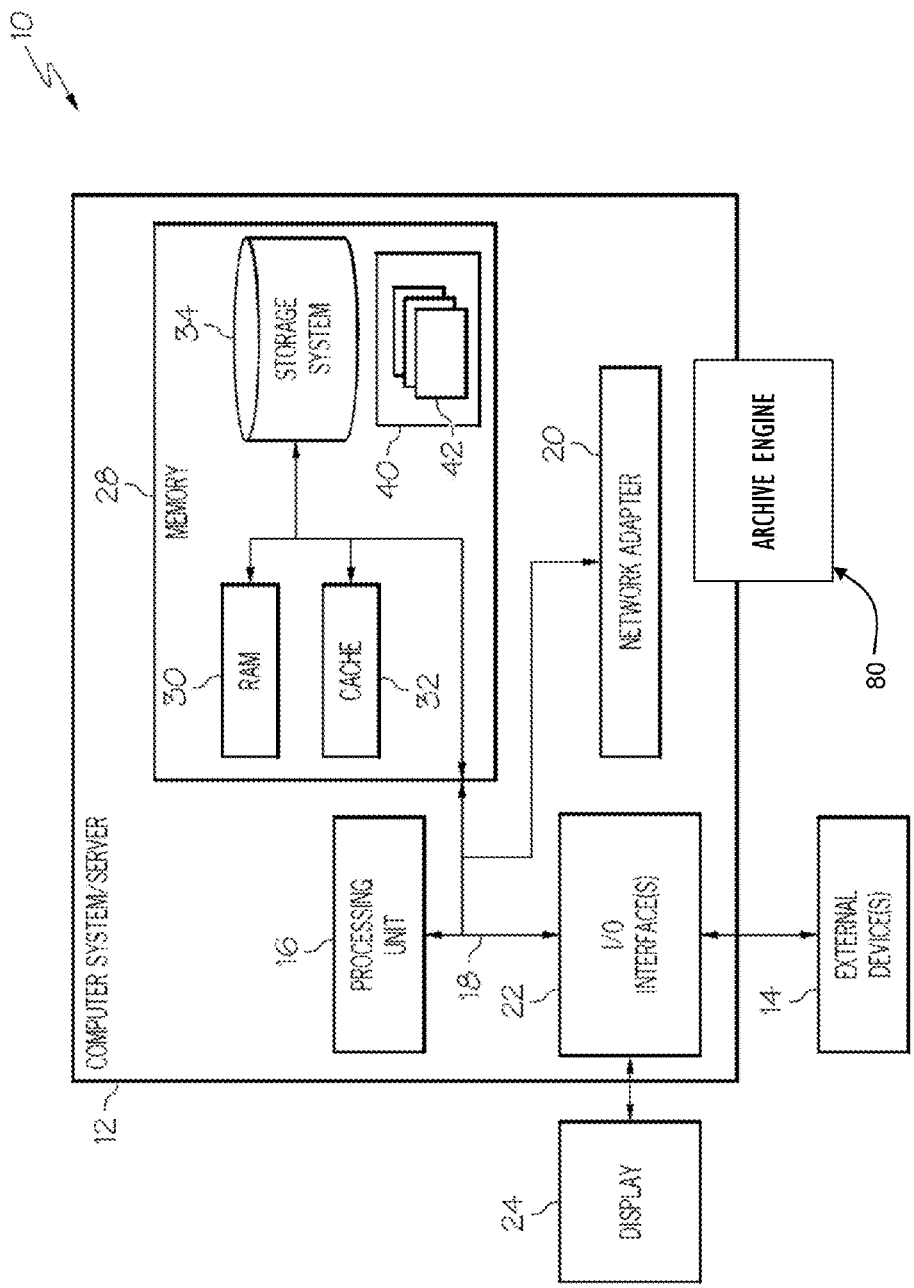
FIG. 1 depicts a cloud computing node according to embodiments of the present invention.

The present invention generally relates to archiving family history and, more particularly, to methods and systems for identifying and storing information in a family tree archive. According to aspects of the invention, Internet-based sources are examined for data that may be included in the family tree archive. In embodiments, a computer application referred to as an archive engine permits a user to define policies regarding the data to be collected, and gathers data from Internet-based sources and saves the data in an electronic family tree archive in accordance with the user-defined policies. In additional embodiments, the archive engine identifies new sources of data associated with individuals of the family tree by matching individuals in the family tree to contact lists contained in the Internet-based sources. In this manner, implementations of the invention provide systems and methods for automatically identifying and adding data to a family tree archive.

Internet technology provides an opportunity to gather family archive information (e.g., photos, video, accomplishments, general history, etc.), and also to limit the loss of such information by insuring it against localized disaster and neglectful data management. For example, Internet-based search engines enable easy location and retrieval of public records such as patent inventorship, news articles, and other information. Internet-based social networking sites provide access to pictures (often tagged to indicate who is in them), videos, posts from individuals, and a network of contacts that in some cases indicates family relations. Internet-based professional networking sites provide a history of job changes and interests. Along with all the individualized information, various companies provide Internet-based family tree analysis and can provide partial family trees.

Embodiments of the invention leverage information available on the Internet and redirect that information into an archive designed around the family tree that is meant to provide management and retention across generations. Aspects of the invention may be implemented as a Software as a Service (SaaS) offering using a storage cloud implementation or service for effective data management. Such a cloud-based implementation may provide interfaces for administration of a family account, uploading additional data, managing/augmenting harvested data and exploring a family tree. Described herein are systems and methods for the identification and collection of data from a wide variety of Internet sources that has potential to be retained in the family tree archive.

In embodiments, SaaS aspects of the invention permit other users (e.g., members of the family tree other than the archive manager) to interact collaboratively to upload personal information and data to the archive. For example, another user may access the archive using their computer device and update their particular profile in the archive, e.g., by editing their biographic information, adding pictures or other content, adding links to their social networking and professional networking websites, etc. Such SaaS aspects of the invention permit the archive to be stored in a cloud environment and accessed by many different users from computing devices at different physical locations. However, it is to be understood that the invention is not limited to a cloud implementations and, in particular, a SaaS implementation; rather, aspects of the invention may be utilized in other computing models, such as a software application installed and running on a user's computer device.

Implementations of the invention are based on a family tree, which may be introduced manually by a user (e.g., an archive manager) or obtained from an Internet-based ancestry service, or some combination of both. Starting with this structure provides options to manage the scope of the tree to be collected, and also provides a set of filter criteria to assess other data sources for potential relevance. For example, starting with this structure, the user may filter the contact lists of accepted relatives in the family tree looking for name matches and new connections in Internet-based data sources.

In embodiments, a user (e.g., archive manager) defines policies that define how the archive engine collects data from the Internet-based sources for the purpose of including such data in the archive. Policies may include relationship policies and content policies. Relationship policies may define relationship distances, such as depth of generations to include in the family tree and breadth of relations to include at each generational level (e.g., siblings, spouse, children, cousins, second cousins, etc.), that are traversed by the archive engine when searching for Internet-based content to be added to the archive. Content policies may define types and/or amounts of data that are collected from Internet-based sources for inclusion in the archive, e.g., job related data from a particular professional networking website, tagged pictures from a particular social-networking website and/or picture-sharing website, maximum file sizes, etc. These content policies may provide controls that are oriented around cost control due to data costs and filtering. In this manner, implementations of the invention pull information from various Internet-based sources for inclusion in the family tree archive based on the policies.

In accordance with aspects of the invention, the archive engine builds an electronic repository of data (e.g., a family tree archive) by crawling through nodes in the archive, identifying Internet-based data sources associated with individuals contained in the family tree, and storing data from the identified sources in the archive. Such crawling may be performed, for example, using a genealogical data communication (GEDCOM) format, or any other suitable format. In embodiments, a model for discovery of Internet-based data sources is oriented around leveraging the various networks of contacts that are contained in social networking and professional networking websites. The archive engine may utilize various application program interfaces (APIs) to access particular social networking and professional networking websites to compare names listed as contacts at these websites to names in the family tree, thereby identifying Internet based data sources associated with individuals listed in the family tree. Upon identifying a data source associated with an individual contained in the family tree, the archive engine may gather data from the identified source for inclusion in the archive according to the content policies. The archive engine may also use information from the social networking and professional networking websites to perform additional searches for other Internet-based data associated with an individual contained in the family tree, such as news articles, publications, patent inventorship, etc.

In embodiments, the archive engine contains logic to differentiate between new versus previously examined data, e.g., to avoid repeatedly reviewing the same data. For example, collection dates of data, key values such as hash values, or other data may be retained by the archive engine to allow follow-on runs to differentiate for each source. Additionally, the archive engine may use various storage model optimizations and analysis, such as data deduplication, to reduce or eliminate duplicate data in the archive.

Cloud Computing

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

For convenience, the Detailed Description includes the following definitions which have been derived from the "Draft NIST Working Definition of Cloud Computing" by Peter Mell and Tim Grance, dated Oct. 7, 2009, which is cited in an IDS filed herewith, and a copy of which is attached thereto.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove. FIG. 1 can also represent a computing infrastructure capable of performing and/or implementing tasks and/or functions of the methods described herein.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16. In embodiments, the computer system/server 12 comprises or communicates with an archive engine 80 as described in greater detail herein.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein. For example, some or all of the functions of the archive engine 80 may be implemented as one or more of the program modules 42. Additionally, the archive engine 80 may be implemented as separate dedicated processors or a single or several processors to provide the functionality described herein. In embodiments, the archive engine 80 performs one or more of the processes described herein, including but not limited to: permitting a user to define relationship and/or content policies for a family tree archive; crawling through nodes in the archive to identify Internet-based data sources associated with nodes in the archive; storing data from the identified sources in the archive; permitting users to manually add data to the archive and/or edit data contained in the archive; and permitting users to view the data contained in the archive.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID (redundant array of inexpensive disks or redundant array of independent disks) systems, tape drives, and data archival storage systems, etc.

As will be appreciated by one skilled in the art, aspects of the present invention, including the archive engine 80 and the functionality provided therein, may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 2:
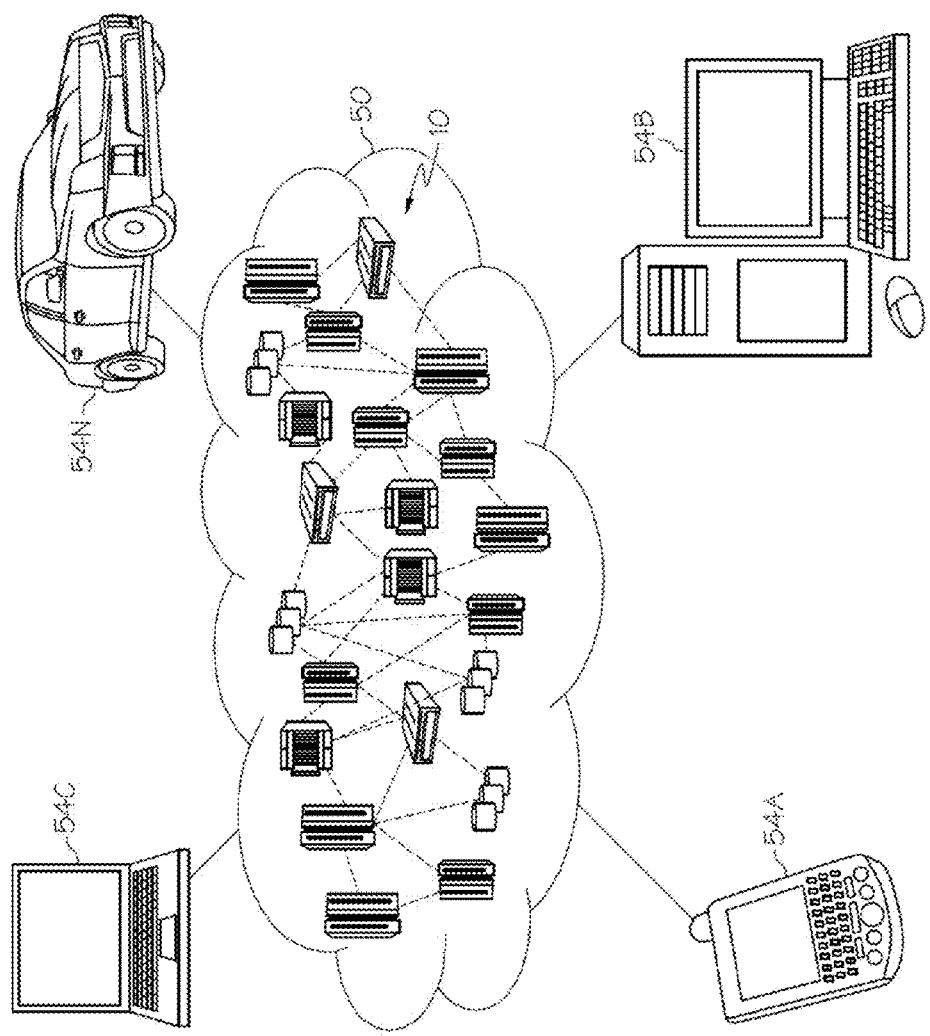
FIG. 2 depicts a cloud computing environment according to embodiments of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
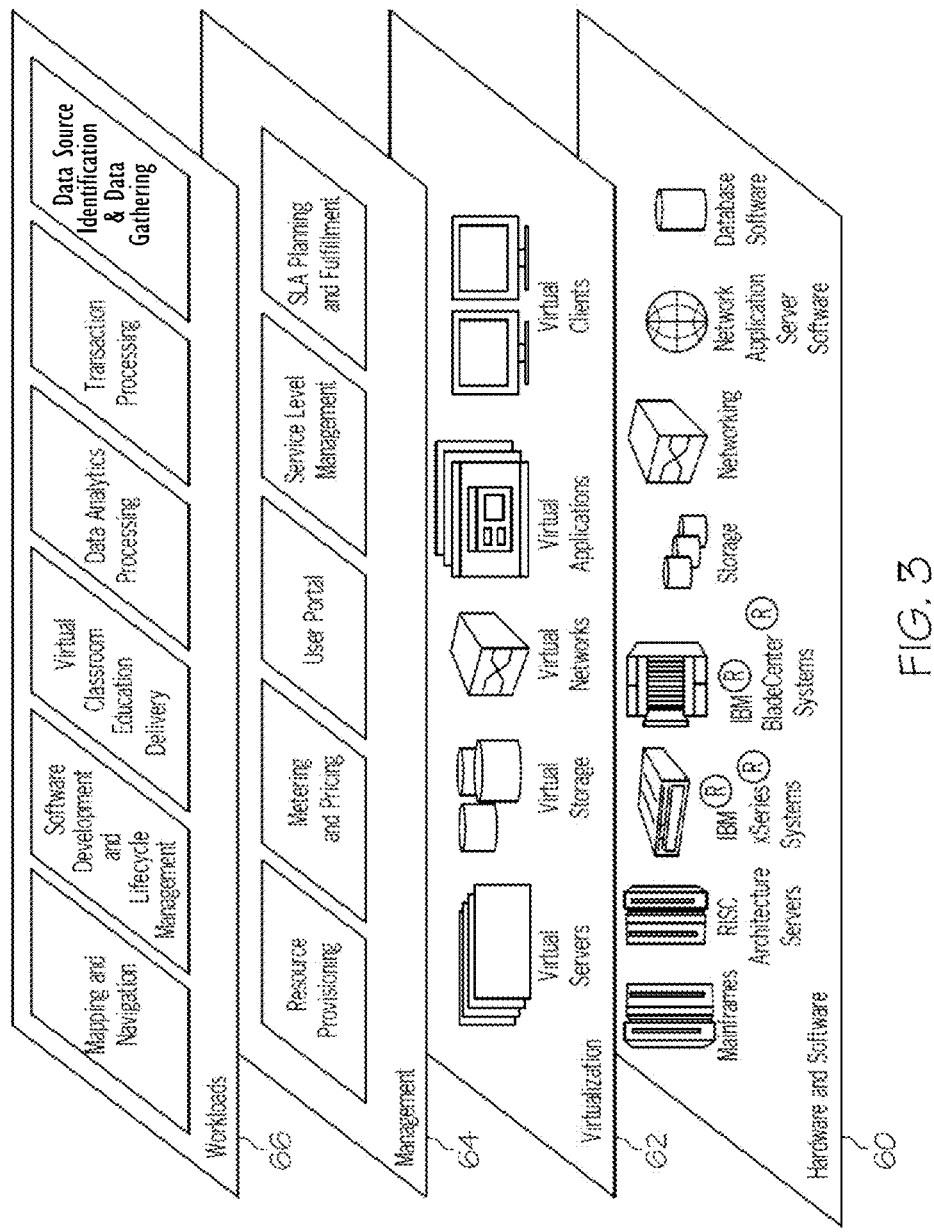
FIG. 3 depicts abstraction model layers according to embodiments of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and data source identification and data gathering. In accordance with aspects of the invention, the data source identification and data gathering workload/function operates to perform one or more of the processes described herein and with respect to archive engine 80, including but not limited to: permitting a user to define relationship and/or content policies for a family tree archive; crawling through nodes in the archive to identify Internet-based data sources associated with nodes in the archive; storing data from the identified sources in the archive; permitting users to manually add data to the archive and/or edit data contained in the archive; and permitting users to view the data contained in the archive.

Block Diagram And Exemplary Operation

Figure 4:
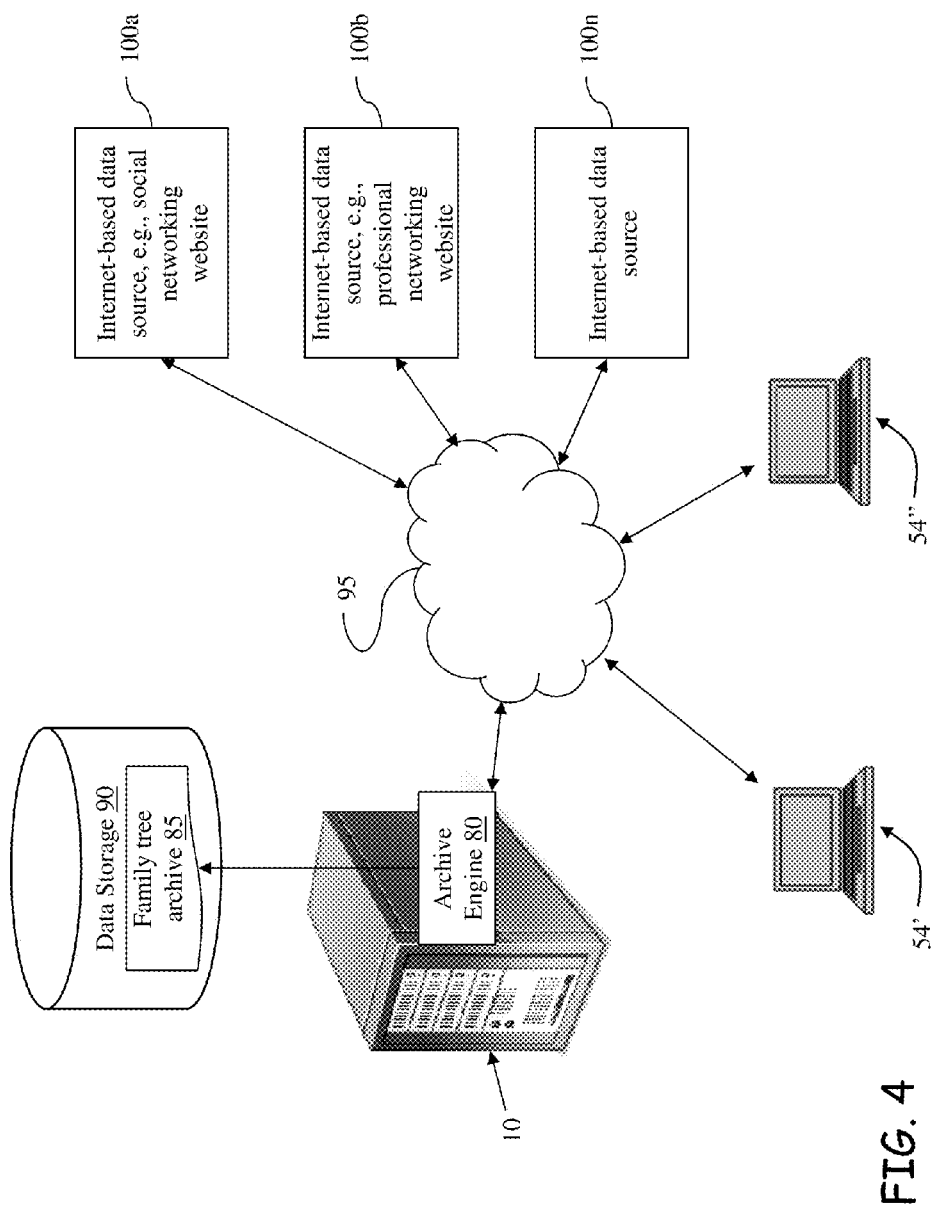
FIG. 4 depicts an archiving block diagram in accordance with aspects of the invention.

FIG. 4 depicts an archiving block diagram in accordance with aspects of the invention. In embodiments, a computer device 10 runs or communicates with an archive engine 80 as described with respect to FIG. 1. The archive engine 80 stores a family tree archive 85 at a physical data storage device 90, which may comprise, for example, a storage node in the cloud as depicted in FIG. 2. Local computing devices 54' and 54" can communicate with the archive engine 80 through a communication network 95, e.g., the Internet. Local computing devices 54' and 54" may be similar to the local computing devices 54A-N depicted in FIG. 2. Local computing devices 54' and 54", as well as the archive engine 80, can communicate with any number of Internet-based data sources 100a, 100b, . . . , 100n via the network 95, e.g., via the Internet.

In accordance with aspects of the invention, the Internet-based data sources 100a, 100b, . . . , 100n may comprise any suitable data source that is accessible via the Internet. For example, Internet-based data source 100a may comprise a social networking website, e.g., an online service, platform, or site that focuses on building and reflecting of social networks or social relations among people. The social networking website may permit users to, for example: create representations of themselves (e.g., profiles) including relationship status; maintain lists of contacts (e.g., friends); upload and display pictures, videos, hyperlinks, other content.

Internet-based data source 100b may comprise a professional networking website, e.g., a business-related networking website. Similar to a social networking website, a professional networking website may comprise an online service, platform, or site that permits users to present data about themselves via the Internet. A professional networking website may permit users to, for example: create representations of themselves (e.g., profiles) including employment status; maintain lists of contacts (e.g., business related contacts); upload and display pictures, videos, hyperlinks, other content.

Other Internet-based data sources, e.g., source 100n, may comprise any other publicly available data on the Internet including, but not limited to, picture sharing sites, news articles, publications, etc. Although three sources 100a, 100b, 100n are shown, the invention may be implemented with any number of sources.

In an illustrative and non-limiting example described with respect to FIG. 4, an archive manager referred to as user "Alice" uses her local computing device 54' to access the archive engine 80 in an SaaS implementation of the invention. Alice creates a family tree archive 85 by manually entering a family tree using an interface provided by the archive engine 80 or imports a family tree to the archive engine 80 from a third party, e.g., a service provider website that generates electronic versions of family trees. For purposes of this example, the family tree initially includes Alice and her brother "Bob", each of which is represented by a node in the archive 85. As used herein, a node is a data structure contained in the archive 85 that contains data associated with a particular individual in the family tree. Such data may include, but is not limited to, name, age, gender, birth date, place of birth, place of residence, job title, pictures, videos, relationship status, links to accounts at websites, contact information such as telephone number and/or email address, etc.

As the archive manager, Alice may be prompted by the archive engine 80 to enter policies that define how the service will gather data for the archive. For example, the archive engine 80 may provide an interface at Alice's computing device 54' that prompts her to indicate relationship policies, e.g., rules that define how many generations in the family tree to analyze, such as direct predecessor generations, indirect predecessor generations, direct descendants, indirect descendants, etc. The archive engine 80 may also prompt Alice to define one or more content policies, e.g., rules that define what types of data will be gathered for the archive 85, such as video size limits, custom data upload limits, administrative control levels for other users of the archive, relationship node addition, node ownership rules, etc. The policies may be indicated in any suitable manner, such as the archive engine 80 presenting the archive manager with a list of policies and permitting the archive manager to select which ones of the policies in the list to apply to this archive 85. Additionally or alternatively, the archive engine 80 may apply predefined sets of policies to the archive 85 based on a level of service plan or subscription purchased by the archive manager.

The archive manager may also edit the information associated with one or more of the nodes of the archive 85. For example, using an interface provided to her computing device 54' by the archive engine 80, Alice may edit her node by inputting her name, age, gender, birth date, place of birth, place of residence, job title, pictures, videos, relationship status, links to accounts at websites, contact information such as telephone number and/or email address, etc., via the interface. In particular, Alice may edit her node by uploading to the archive 85 a link to her account at social networking site 100a. Alice may also edit her node by providing permission for the archive engine 80 to access her account at the social networking site 100a for the purpose of gathering data for the archive 85.

In accordance with aspects of the invention, the archive engine 80 analyzes Alice's account at the social networking site 100a looking for data that complies with the content policies. As but one example, the content policies may define that pictures in which the individual is tagged are acceptable data. As such, the archive engine 80 searches Alice's account at the social networking site 100a for pictures in which Alice is tagged, and saves any such pictures as part of Alice's node in the archive 85. In this manner, implementations of the invention automatically gather Internet-based data (e.g., pictures from a social networking site) for inclusion in the family tree archive 85.

In accordance with additional aspects of the invention, the archive engine 80 analyzes Alice's list of contacts (e.g., friends) associated with her account at the social networking site 100a, and compares the names in this list of contacts to the names of individuals already included in the archive 85. By definition, any person listed in Alice's list of contacts at site 100a also has an account with site 100a. When the engine finds a match between a name in Alice's list of contacts at site 100a and a name in the archive 85, the archive engine 80 sends a communication to the person asking the person for permission to link their account at website 100*a* to the archive 85.

For example, Alice's list of contacts at site 100*a* includes Bob. And, as already described, the archive 85 includes a node for Bob. The archive engine 80 determines that the Bob's name in Alice's list of contacts at site 100*a* is the same as, or sufficiently similar to, Bob's name in the archive 85. Accordingly, the archive engine 80 transmits a message to Bob indicating the match and asking Bob for permission to link Bob's account at site 100*a* to the archive 85. If Bob responds affirmatively, then the archive engine 80 analyzes Bob's account at the social networking site 100*a* looking for data for inclusion in the archive, e.g., pictures or other data that complies with the content policies. The archive engine 80 also analyzes Bob's contact list at site 100*a* for names that match names in the archive 85, in the same manner as already described with respect to Alice. In this manner, implementations of the invention provide a mechanism for automatically identifying new Internet-based data to be considered for inclusion in the archive 85.

According to additional aspects of the invention, and still referring to the example described with respect to FIG. 4, the archive engine 80 may analyze Alice's and/or Bob's account at site 100*a* for links to content at other sites. For example, Alice's account at social networking site 100*a* may include data indicating that Alice also has an account at professional networking site 100*b*. Upon discovering this data, the archive engine 80 may send Alice a message indicating the possible match and asking Alice for permission to link Alice's account at professional networking site 100*b* to the archive 85. If Alice responds affirmatively, then the archive engine 80 analyzes Alice's account at the professional networking site 100*b* looking for data for inclusion in the archive, e.g., current job title or other data that complies with the content policies. The archive engine 80 also analyzes Alice's account at professional networking site 100*b* looking for links to other data, e.g., names in contact list that match names in the archive 85, data indicating content associated with Alice at another Internet based data source 100*n*, etc.

Although only two nodes (e.g., Alice and Bob) and two websites (e.g., social networking site 100*a* and professional networking site 100*b*) are described in this example, it should be apparent to one of skill in the art that the archive engine 80 may crawl through any number of nodes in the manner described herein looking for data at any number of sites (e.g., across at least one of the Internet, an intranet, and an extranet) for potential inclusion in the archive 85. In this manner, implementations of the invention provide a mechanism for automatically identifying new Internet-based data to be considered for inclusion in the archive 85.

According to additional aspects of the invention, and still referring to the example described with respect to FIG. 4, the archive engine 80 may be configured to suggest new nodes for addition to the archive, e.g., new people for addition to the family tree. Some social networking sites include data indicating familial relationships. For example, Alice's account at social networking site 100*a* may indicate she has a spouse named Charlie. Upon discovering this data, the archive engine 80 searches the archive 85 to determine if the archive contains a node matching this data, e.g., spouse of Alice and named Charlie. If no such node is found, the archive engine 80 may be configured to prompt Alice, e.g., via the interface at local computing device 54', to add a node in the archive 85 representing Charlie. If Alice accepts, then the engine adds the node for Charlie to the archive 85. Charlie's node is then included in the analysis, e.g., in the manner already described with respect to Alice and Bob, the next time the archive engine 80 crawls through the nodes looking for content to add to the archive 85. In this manner, implementations of the invention provide a mechanism for automatically identifying possible new nodes for the archive 85.

In addition to automatically seeking and adding Internet-based data to the archive, aspects of the invention also permit other users to add content to their node in the archive 85. For example, Bob may access the archive 85 via another local computing device 54" and edit his node information, e.g., by uploading pictures to his node, deleting unwanted pictures from his node, updating job status, uploading links to websites, etc. Such collaboration amongst the users associated with the nodes is provided by SaaS aspects of the invention.

In embodiments, the archive engine 80 is configured such that users other than the archive manager have a lower ability to edit the archive 85 than the archive manager. For example, the archive manager may have relatively powerful administrator privileges for editing the archive 85, whereas another user may have relatively less powerful user privileges for editing the archive 85. As but one illustration, the archive engine 80 may be configured such that user Bob may only edit his node, whereas archive manager Alice may have permission to edits all of the nodes. Also, there may be plural different levels of privileges for editing the archive 85. For example, the archive engine 80 may be configured to permit the archive manager to delegate administrator privileges to a particular user for a particular subset of nodes. As but one illustration, the archive engine 80 may be configured such that parents are given full administrator privileges for editing nodes of their children. As another illustration, the archive engine 80 may be configured to permit the archive manager and/or a first user to delegate a second user as having editing privileges with respect to the first user's node.

According to aspects of the invention, the archive engine 80 may be configured to permit a user associated with a node in the archive 85 to decline adding newly found data to the archive 85. For example, the archive engine 80 may discover a picture in which Bob is tagged at Charlie's account at social networking website 100*a*. Before adding the picture to Bob's node in the archive 85, the engine prompts Bob, e.g., via message to an interface at Bob's local computing device 54", for permission to add the picture to the archive 85. If Bob indicates permission, then the engine adds the picture to the archive 85 such that all other users of the archive 85 will be able to see the picture in association with Bob's node. On the other hand, if Bob denies permission, then the engine does not add the picture to the archive 85. In this manner, implementations of the invention provide the users of the archive with a filter mechanism for keeping unwanted data out of the archive.

In accordance with additional aspects of the invention, the archive engine 80 may be configured to periodically update the archive 85, e.g., by performing the above-described crawling through nodes looking for new content and/or new nodes on a scheduled basis (e.g., daily, weekly, monthly, or any other suitable time frame). In embodiments, the archive engine 80 is configured to track changes that are made to the archive 85 during such updates. For example, the archive engine 80 may be configured to maintain a log of any new data that is added to the archive and on what date such data was added. The archive engine 80 may be configured to generate an update report, e.g., a periodic newsletter, and transmit the report to the email address contained in each node. In this manner, the members of the family tree may be provided with a periodic, e.g., yearly, newsletter showing all new data that was added to the archive within the past time period.

Flow Diagrams

Figure 5:
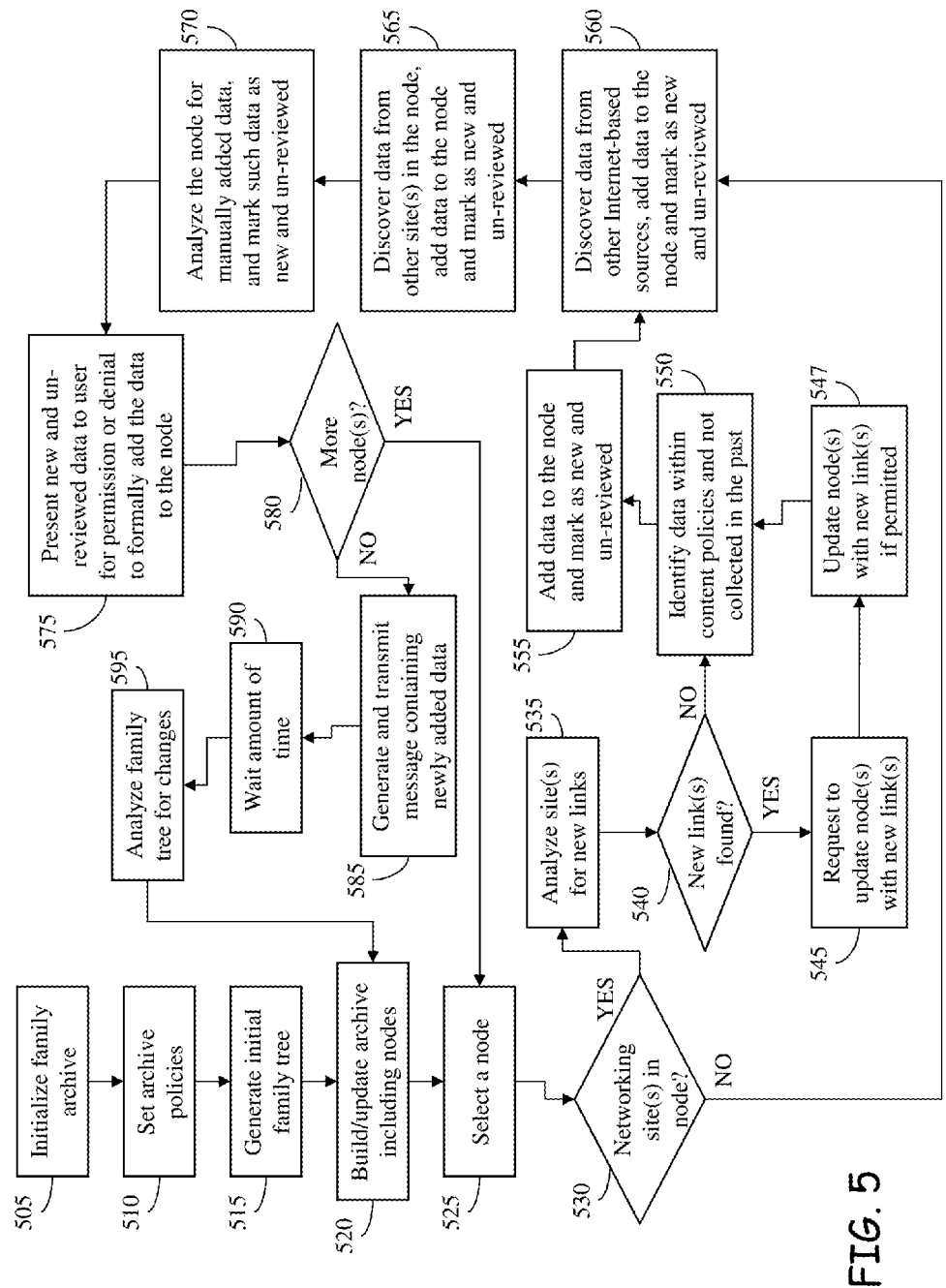
FIG. 5 depicts an exemplary flow diagram in accordance with aspects of the invention.

FIG. 5 shows an exemplary flow for performing aspects of the present invention. The steps of FIG. 5 may be implemented in any of the environments of FIGS. 1-4, for example.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Furthermore, the invention can take the form of a computer program product accessible from a computer-usable or computer-readable medium providing program code for use by or in connection with a computer or any instruction execution system. The software and/or computer program product can be implemented in the environment of FIGS. 1-4. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disc—read/write (CD-R/W) and DVD.

FIG. 5 depicts an exemplary flow depicting aspects of processes in accordance with aspects of the present invention. At step 505, a user initializes a family archive (e.g., archive 85) using a computing device (e.g., local computing device 54') that communicates with an archive engine (e.g., archive engine 80 running on computer system 10). For example, the user may access a website, service, or platform of a service provider associated with the archive engine and generate a new family archive via an interface of the website, service, or platform. The user that initializes the archive at step 505 may be an archive manager as already described herein.

At step 510, the archive manager sets one or more policies for the archive, e.g., as described with respect to FIG. 4. In embodiments, the archive engine prompts the archive manager to select one or more policies from a list of predefined policies, or automatically assigns a group of predefined policies to the archive based on a subscription level of the archive. The policies may include, but are not limited to, relationship policies and content policies, as already described herein. At step 515, the archive manager manually builds a family tree using the archive engine or imports a family tree to the archive engine, e.g., as described with respect to FIG. 4.

At step 520, the archive engine builds an archive by creating a node (e.g., data structure) for each person in the family tree, linking the nodes according to familial relations defined in the family tree, and saving the archive at a data storage device (e.g., data storage device 90). Step 520 may additionally include the archive manager and/or other users providing data to one or more of the nodes. For example, step 520 may include the archive manager and/or other users using their local computing device to input and/or upload data to their node in the archive. As described with respect to FIG. 4, such data may include, but is not limited to: name, age, gender, birth date, place of birth, place of residence, job title, pictures, videos, relationship status, links to accounts at websites, contact information such as telephone number and/or email address, etc.

Step 525 represents the beginning of an iterative process for periodically updating the archive in which the archive engine crawls through the nodes of the archive looking for links to Internet-based data for potential inclusion in the archive, e.g., as described with respect to the example in FIG. 4. At step 525, the archive engine selects a node. At step 530, the archive engine determines whether there are any websites (e.g., social networking sites, professional networking sites, etc.) identified in the selected node. When there is at least one website in the selected node, then at step 535 the archive engine inspects the website(s) for new links, e.g., (i) a name that matches a name in another existing node (e.g., another name in the family tree), and (ii) any links to another site (e.g., website) at which the user associated with the selected node has an account, both of which are described in the example associated with FIG. 4.

At step 540, the archive engine determines whether any new links are found at step 535. When it is determined that a new link is found, then at step 545 the archive engine sends a message to the user associated with the new link requesting permission to update this user's node with a link to website, e.g., as described above with respect to FIG. 4. At step 547, the archive engine adds the link to the site to the user's node when the user indicates permission in response to the message from step 545; otherwise the engine does not add a link to the site to the user's node.

At step 550, the archive engine discovers data for the selected node (e.g., from step 525) that complies with the content policies and which has not been collected in the past. For example, the archive engine analyzes all the networking websites identified in the selected node for data that both conforms to the content policies and has not been collected for this node in a previous update of the archive. At step 555, the archive engine conditionally adds the data from step 550 to the node and marks the added data as new and un-reviewed. The addition is conditional in the sense that the data is not yet viewable by other users of the archive, and the data may be removed from the node at step 575 described herein.

At step 560, the archive engine uses data in the selected node and/or data in websites identified in the selected node to search for other Internet-based data for potential addition to the archive. In embodiments, the archive engine searches Internet news feeds and other selected public records available on the Internet for any data that is related to the user associated with the selected node and that conforms to the content policies. The archive engine uses suitable logic that takes into account data in the selected node and/or data in websites identified in the selected node to determine a probability that any Internet-based data discovered at step 560 is actually related to the user associated with the selected node. When the probability exceeds a predefined threshold value and the data satisfies the content policies, the archive engine conditionally adds the data to the node and marks the added data as new and un-reviewed, e.g., similar to step 555.

At step 565, the archive engine analyzes any other websites identified in the selected node that have not yet been analyzed for new data in the current iteration. These websites may include, for example, picture upload sites and other upload sites at which the user associated with the node has an account and which are linked to in the node. The archive engine analyzes these sites for data that satisfies the content policy and which has not been collected for this node in a previous update of the archive. Any data satisfying these criteria is conditionally added to the node and marked as new and un-reviewed, e.g., similar to step 555.

At step 570, the archive engine analyzes the selected node for any new data that was uploaded by a user, e.g., data that was not present in the node at the previous update and which was not automatically identified and collected from a website. The archive engine marks any such data as new and un-reviewed, e.g., similar to step 555.

At step 575, the archive engine presents all of the data marked as new and un-reviewed to a user for permission or denial to add the data to the selected node of the archive. In embodiments, the archive engine determines the user who controls the selected node, whether it is the user directly associated with the node or another user who has been delegated control of the selected node. The archive engine presents each new and un-reviewed piece of data to the user who controls the node, e.g., via the interface at the user's local computing device, and permits the user to individually permit or deny adding each piece of data to the archive. For data that the user permits, such data is formally saved in the archive in the selected node and, as such, is viewable by other users of the archive. On the other hand, for data that the user denies, such data is not saved in the archive in the selected node; although a record of such denied data is maintained so that the engine can avoid collecting this data again in future updates of the archive. Additionally or alternatively, the archive engine may be configured to automatically approve some or all of the new and un-reviewed data without any input from a user. For example, the policies may be used to define certain types of new and un-reviewed data that are automatically approved and formally saved in the archive in the selected node. Such automatic approval for certain pre-defined types of data can be used in implementations of the invention to reduce the workload on the human user for reviewing every piece of new data.

At step 580, the archive engine determines whether there are any more nodes remaining in the archive that have not yet been analyzed during the current update. When there is at least one node remaining, then the process returns to step 525 and selects a next node for analyzing. On the other hand, when there are not any more nodes remaining to be analyzed during this update, then at step 585 the engine generates a message containing all the new data that was added to the archive in the current update and transmits the message to all of the users of the archive, e.g., similar to an email newsletter of updates to the archive, as described with respect to FIG. 4.

At step 590, the archive engine waits a predetermined amount of time (e.g., days, a week, a month, a year, etc.) before beginning the next update of the archive. At step 595, the archive manager analyzes the family tree for any changes, e.g., additional family members, and inputs data reflecting such changes via the interface of the archive engine. Step 595 may be performed any time during the waiting period of step 590. After the waiting period of step 590 has passed, the process returns to step 520 where the archive engine updates the archive based on any new information added at step 595, e.g., the archive manager adds a new node to the archive, and begins a new update process for discovering and adding Internet-based data to the archive.

As described herein, implementations of the invention facilitate identifying members of the extended family tree by using data contained in the family tree archive in combination with Internet-based data such as social networking and professional networking sites. Implementations of the invention also reduce the amount of manual effort involved in gathering information and artifacts about the family on an ongoing basis by utilizing automated, policy-based data collection from a large variety of sources. Implementations of the invention also provide a flexible storage system with long term retention and family tree context in the sense that the use of a central storage cloud removes the burden of retaining and protecting the data from an individual family member. Lastly, implementations of the invention also facilitate a collaborative environment for the family tree archive since interfaces in accordance with aspects of the invention allow individuals to upload important information not available on the Internet. This collaborative environment advantageously reduces the burden on single or few family members who typically manually manage all of the information in a conventional family archive.

In embodiments, a service provider, such as a Solution Integrator, could offer to perform the processes described herein. In this case, the service provider can create, maintain, deploy, support, etc., the computer infrastructure that performs the process steps of the invention for one or more customers. These customers may be, for example, any business that uses technology and provides or utilizes services. In return, the service provider can receive payment from the customer(s) under a subscription and/or fee agreement and/or the service provider can receive payment from the sale of advertising content to one or more third parties.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method implemented in a computer infrastructure comprising a combination of hardware and software, the method comprising:

creating an electronic archive for a user based on a family tree;

automatically discovering Internet-based data associated with at least one member of the family tree comprising:

crawling through a plurality of nodes and analyzing at least one website identified in at least one of the plurality of nodes;

inspecting the at least one website for at least one new link, wherein the at least one new link is a name that matches a name of a member of the family tree and links to another website at which the user has an account;

requesting permission from the user to update the at least one of the plurality of nodes with the at least one new link;

adding the at least one new link to the at least one of the plurality of nodes upon receiving permission from the user;

identifying the Internet-based data within the at least one website, including data found from the at least one new link, which complies with content policies and has not been collected in the past;

adding the Internet-based data from the at least one website to the archive; and storing the archive at a storage device.

2. The method of claim 1, wherein the discovering, the adding, and the storing are performed by an archive engine associated with a computer device in a cloud environment.

3. The method of claim 1, wherein the storage device is in a cloud environment, and further comprising providing users associated with the archive access to the archive via a Software as a Service (Saas) interface.

4. The method of claim 1, further comprising creating a plurality of nodes in the archive, wherein each respective one of the plurality of nodes corresponds to a respective member of the family tree.

5. The method of claim 4, wherein each one of the plurality of nodes in the archive comprises a data structure that contains at least one of: name, age, gender, birth date, place of birth, place of residence, job title, pictures, videos, relationship status, a link to an account at a website, and contact information.

6. A method implemented in a computer infrastructure comprising a combination of hardware and software, the method comprising:

creating an electronic archive based on a family tree;

automatically discovering Internet-based data associated with at least one member of the family tree comprising:

crawling through a plurality of nodes and analyzing at least one website identified in at least one of the plurality of nodes;

inspecting the at least one website for at least one new link, wherein the at least one new link is a name that matches a name of a member of the family tree and links to another website which the user has an account;

requesting permission to update the at least one of the plurality of nodes with the at least one new link;

adding the Internet-based data from the at least one website to the archive;

storing the archive at a storage device; and creating a plurality of nodes in the archive, wherein each respective one of the plurality of nodes corresponds to a respective member of the family tree, wherein the discovering comprises analyzing at least one website identified in one of the plurality of nodes in the archive for data to be added to the archive; and the inspecting the at least one website for at least one new link comprises:

determining whether a new link is found;

sending a message to a user associated with the new link, requesting permission to update a node of a user with the new link to the at least one website;

adding the new link to the at least one website to the node of the user; and analyzing the at least one website for data that complies with content policies.

7. The method of claim 4, wherein the discovering comprises analyzing the at least one website identified in one of the plurality of nodes for a name that matches the name of a member of the family tree.

8. The method of claim 4, wherein the discovering comprises analyzing the at least one website identified in one of the plurality of nodes for a link to another website at which a user associated with the one of the plurality of nodes has an account.

9. The method of claim 4, wherein the discovering comprises analyzing the at least one website identified in one of the plurality of nodes for relationship status that defines a potential new node.

10. The method of claim 4, wherein the discovering comprises determining that the Internet-based data complies with at least one of content policies and relationship policies associated with the archive.

11. The method of claim 10, further comprising receiving an indication of the content policies from a user of the archive.

12. The method of claim 11, further comprising receiving an indication of the relationship policies from the user of the archive.

13. The method of claim 4, further comprising permitting a user associated with one of the plurality of nodes in the archive to input or upload data to the node.

14. The method of claim 1, further comprising permitting a user to review the Internet-based data prior to the adding the Internet-based data to the archive.

15. The method of claim 1, wherein the adding the Internet-based data to the archive comprises conditionally adding the Internet-based data to the archive, and further comprising:

permitting a user to review the Internet-based data; and receiving an indication from the user permitting or denying formally adding the Internet-based data to the archive.

16. A system implemented in hardware and comprising a computer infrastructure operable to:

create an electronic archive for a user, including a plurality of nodes, wherein each respective one of the plurality of nodes corresponds to a respective member of a family tree;

discover data associated with at least one member of the family tree by crawling through the plurality of nodes and analyzing at least one other site identified in at least one of the plurality of nodes;

inspect the at least one other site for at least one new link and determining whether a new link is found, wherein the new link is a name on the at least one other site that matches at least one member of the family tree;

request permission from the user to update the at least one of the plurality of nodes with the at least one new link;

add the at least one new link to the at least one of the plurality of nodes upon receiving permission from the user;

identify data within the at least one other site, including data found from the at least one new link, which complies with content policies and has not been collected in the past;

receive approval from a user of the archive to add the data to the archive; and add the data to the archive.

17. The system of claim 16, wherein the inspecting further comprises:

sending a message to a user associated with the new link, requesting permission to update a node of a user with the new link to the at least one other site;

adding the new link to the at least one other site to the node of the user; and analyzing the at least one other site for data that complies with content policies, whereinthe at least one other site comprises at least one of a social networking site and a professional networking site.

18. A computer program product comprising a computer readable storage memory or device included in a hardware system having readable program code embodied in the storage memory or device included in the hardware system, wherein the computer program product includes at least one component operable to:

create an electronic archive for a user, including a plurality of nodes, wherein each respective one of the plurality of nodes corresponds to a respective member of a family tree;

discover data associated with at least one member of the family tree by crawling through the plurality of nodes and analyzing at least one website identified in at least one of the plurality of nodes, wherein the discovering comprises:

comparing the at least one member of the family tree to a list of contacts of a user associated with the at least one website, wherein the at least one website is at least one of a social networking website and a professional networking website which the user has an account; and matching the at least one member of the family tree to at least one contact of the list of contacts; and add the data to the electronic archive, wherein the at least one component is further operable to:

inspect the at least one website for at least one new link, wherein the at least one new link is a name that matches a name of a member of the family tree and links to another website at which the user has an account;

request permission from the user to update the at least one of the plurality of nodes with the at least one new link;

add the at least one new link to the at least one of the plurality of nodes upon receiving permission from the user; and identify data within the at least one other site, including data found from the at least one new link, which complies with content policies and has not been collected in the past.

* * * * *